United States Patent [19]

Novorita

[11] Patent Number: 5,404,404
[45] Date of Patent: Apr. 4, 1995

[54] METHOD FOR UPDATING ENCRYPTION KEY INFORMATION IN COMMUNICATION UNITS

[75] Inventor: Robert J. Novorita, Orland Park, Ill.

[73] Assignee: Motorola, Inc., Schaumburg, Ill.

[21] Appl. No.: 84,500

[22] Filed: Jul. 1, 1993

[51] Int. Cl.⁶ ............................................. H04L 9/08
[52] U.S. Cl. ........................................ 380/21; 380/23; 380/25; 380/49; 380/50
[58] Field of Search .................... 380/9, 21, 49, 50, 23, 380/25

[56] References Cited

U.S. PATENT DOCUMENTS

| | | | |
|---|---|---|---|
| 4,993,067 | 2/1991 | Leopold | 380/21 |
| 5,093,860 | 3/1992 | Steinbrenner et al. | 380/21 |
| 5,146,497 | 9/1992 | Bright | 380/21 |
| 5,150,408 | 9/1992 | Bright | 380/21 |
| 5,164,986 | 11/1992 | Bright | 380/21 |
| 5,185,795 | 2/1993 | Bright | 380/21 |
| 5,208,859 | 5/1993 | Bartucci et al. | 380/21 X |
| 5,325,432 | 6/1994 | Gardeck et al. | 380/21 |

Primary Examiner—Bernarr E. Gregory
Attorney, Agent, or Firm—Timothy W. Markison

[57] ABSTRACT

Within a communication system, updating encryption key information in communication units of a particular communication group begins when a key management terminal transmits a key update message for the particular communication group to a communication resource allocator. Upon receipt of the key update message, the communication resource allocator determines a rekey session number from the key update message and allocates a communication resource for the particular communication group. Each active communication unit of the particular communication group receives the rekey session number and compares it to a stored rekey session number. If the numbers do not substantially match, the communication unit affiliates with the allocated communication resource to receive updated encryption key information from the key management terminal.

6 Claims, 2 Drawing Sheets

METHOD FOR UPDATING ENCRYPTION KEY INFORMATION IN COMMUNICATION UNITS

FIELD OF THE INVENTION

This invention relates generally to secure communication systems and, in particular, to updating encryption key information in a communication unit.

BACKGROUND OF THE INVENTION

As is known, secure communication systems provide a medium for users to transmit and receive sensitive information with reduced risk of eavesdropping by unauthorized parties. In a secure communication system, users manually load a key variable (used in the encryption process) into each communication unit by physically attaching a key variable loader to the unit. This limitation complicates key management in a system by making periodic key changes and interoperability of groups that normally use different key variables difficult. To provide for more efficient key management, over-the-air-rekeying (OTAR) was developed.

OTAR allows a fixed computer to send new key variables over the air to the communication units. This feature eliminates the need to physically attach a key variable loader to each communication unit, thus increasing both the efficiency and security of the rekeying process. For additional security, OTAR can be performed on one communication unit at a time or, for convenience, with groups of communication units.

When performing OTAR on a group of communication units within a trunked secure communication system, typically every communication unit associated with the particular group switches to an assigned channel to receive the rekeying information. The ideal scenario would be that every communication unit of the particular group is rekeyed on a first attempt. However, this is not typically the case. There are two options to remedy this scenario. One option is to individually page each communication unit to the OTAR channel and rekey them individually. This method increases key management terminal and communication resource loading. The other option is to continually page and rekey the entire group until all the desired communication units are rekeyed. This option takes active communication units off the control channel and rekeys them even if the unit had previously received the rekeying information. In this manner, previously rekeyed communication units are needlessly idled off the trunked system for each subsequent redundant group page rekey attempt. The more iterations required to rekey the group, the more idle time the subscriber will experience and the more loaded the key management terminal and the communication resource will be.

Therefore a need exists for a more efficient method to rekey a group of communication units that minimizes loading of the key management terminal and communication resources and does not needlessly take the communication units from the control channel when they have already been updated with the rekeying information.

DESCRIPTION OF A PREFERRED EMBODIMENT

Generally, the present invention provides a method for communication units to receive updated encryption key information on a communication group basis. The method provides encryption key distribution to and reception by groups of communication units in a system. A central computer serves as an encryption key management terminal host which initiates the group updating procedure. The updating procedure requires the key management terminal to transmit a key updating message to a communication resource allocator. Upon receipt of the key updating message, the communication resource allocator transmits a group identification number and rekey session number to all system communication groups. The active communication units of a communication group, identified by the group identification number, compares the rekey session number to a rekey session number stored in memory. If the numbers do not substantially match, the active communication unit affiliates with the key management controller to receive updated encryption key information. When the numbers match, the communication unit stays on line, i.e. does not affiliate with the allocated communication resource. In this manner, only communication units that have outdated encryption key information are taken off line, thus eliminating redundant rekeying.

Figure 1:
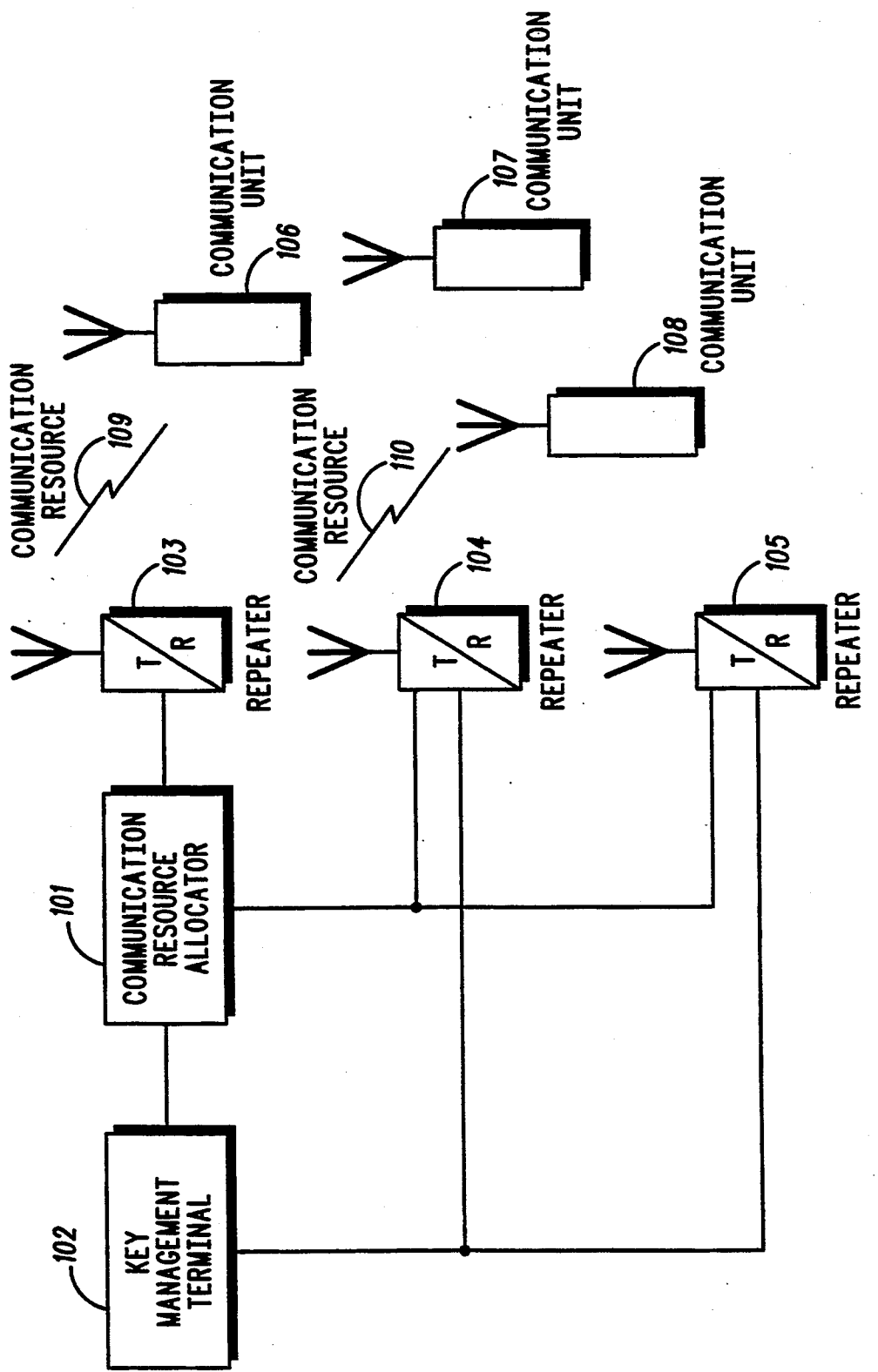
FIG. 1 illustrates a secure communication system in accordance with the present invention.
Figure 2:
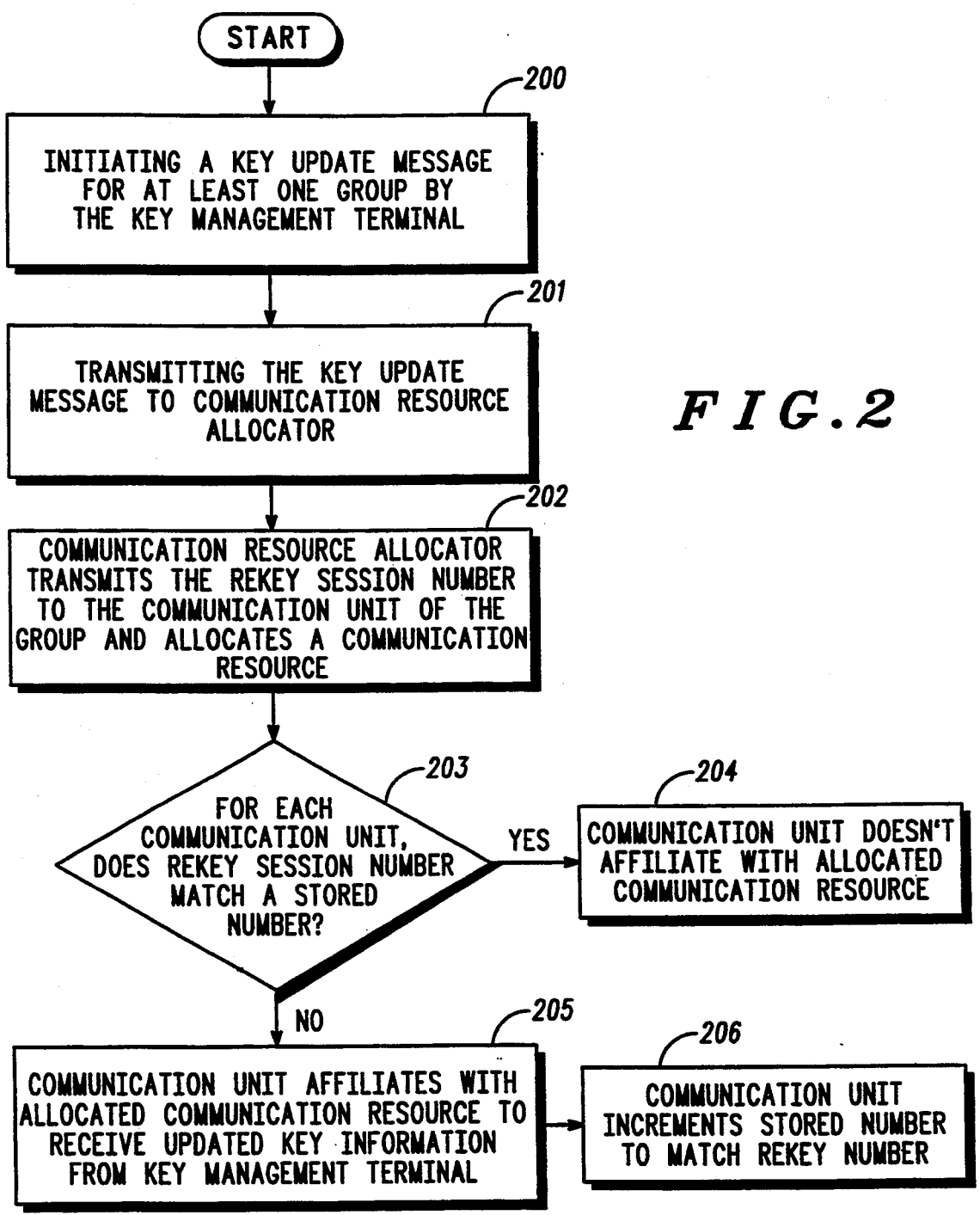
FIG. 2 illustrates a logic diagram that a communication system may implement in accordance with the present invention.

The present invention can be more fully described with references to FIGS. 1 and 2. FIG. 1 illustrates a secure communication system that comprises a communication resource allocator 101, a key management terminal 102, radio frequency (rf) repeaters 103–105, communication units 106–108, and communications resources 109–110. The communication resource allocator 101 assigns the communication resources, or rf channels 109–110 to appropriately authorized communication units through a common signalling rf channel such as a SmartNet trunked central controller and system manufactured by Motorola, Inc. The key management terminal, which may be a central computer, 102 generates encryption keys, assigns specific key variables to predefined communications groups and individuals, initiates and transmits rekeying signalling messages to predefined communications groups and individuals, and transmits updated key variables to identified communications units. The rf repeaters 103–105 provide a physical conversion mechanism between the communication resources 109–110 domain and the audio/data baseband frequency domain. The conversion enables the baseband-level data signalling and payload messages generated by the communication resource allocator 101 and the key management terminal 102 to be transported through an identified media, typically air, to the communications units 106–108. The repeaters 103–105 may be fixed units such as MSF5000 repeaters manufactured by Motorola, Inc. The communication units 106–108 decode the information sent via the communications resources 109–110 and store the rekey session number and encryption key variable in its memory (not shown) and may be a portable or vehicle mounted radio such as a System Saber Radio manufactured by Motorola, Inc.

FIG. 2 illustrates a logic diagram that a communication system may be used to implement the present invention. At step 200, the key management terminal initiates a key update message for communication units of at least one particular communication group based on a predetermined communication group updating scheme. The key update message contains information fields for group identification variable and rekey session number. The predetermined communication group updating scheme may consist of the key update message being stimulated manually, by an operator, or automatically, by a computer automatic instruction. The scheme may also consist of generating the key update message at predetermined time intervals, where the length of time between the intervals depends on a system manager's discretion and is typically not less than 2 weeks.

Next, the key management terminal transmits the key update message to the communication resource allocator via a wireline communication port 201. The wireline communication port outputs baseband data which is formatted into a specific protocol and transported to the communication resource allocator through a wireline communications circuit or equivalent.

When the communication resource allocator receives the key update message 202, it allocates a communication resource and places the unaltered key update message information fields into a predefined location in a common channel signalling protocol and transports the information to the communication units. When the communication units receive the key update message, each active unit compares the group identification variable with an internal group identification variable. If the group identification variable matches the internal group identification, i.e. the communication unit is a member of the at least one particular communication group, the rekey session number contained in the key update message is compared to a stored rekey session number in the communication unit's memory 203. If the rekey session number substantially matches the stored rekey session number 203, the communication unit continues monitoring of the common signalling channel and does not affiliate with the allocated resource 204. If the rekey session number and the stored rekey session number do not substantially match 203, the communication unit affiliates with the allocated communication resource to receive updated encryption key information from the key management terminal 205. Once affiliated, the key management terminal transmits updated key variable information to the communications units through the allocated communication resource until the update process is complete.

The communication unit, upon completion of a successful key message transaction, increments the stored rekey session number to the appropriate value to match the rekey session number 206. The above process can be repeated frequently during a twenty-four hour period to ensure that all communication units of the particular communication group get updated. Once the communication unit has been updated with new encryption information, it utilizes the new key information when encrypting/decrypting information.

The communication unit has two physical key variable storage locations, an active key variable and a backup key variable. A pointer indicates the active key variable and the backup key variable. The active key variable is currently used by the communication unit to encrypt information while the backup key variable is not. The backup key is the key which has been identified above for physical key updating. The communication unit continues using the active key until an independent message instructs the unit to switch the pointer from the active key to the backup key at which time, the active key becomes the backup key and vice versa.

The present invention provides a method for communication units to receive updated encryption key information on a communication group basis. With such a method only the communication units which lack the updated encryption key information are moved from monitoring the control channel to an allocated communication resource to receive updated encryption key information, thereby eliminating redundant rekeying.

I claim:

1. In a secure communication system that includes a plurality of communication units, a limited number of communication resources, a communication resource allocator, and a key management terminal, wherein the plurality of communication units are arranged into communication groups, a method for the plurality of communication units to receive updated encryption key information on a communication group basis, the method comprises the steps of:

a) initiating, by the key management terminal, a key updating message for at least one particular communication group based on a predetermined communication group updating procedure;

b) transmitting, by the key management terminal, the key updating message to the communication resource allocator;

c) transmitting, by the communication resource allocator, a rekey session number to the communication units of the at least one particular communication group;

d) comparing, by each active communication unit of the at least one particular communication group, the rekey session number with a stored rekey session number; and e) for the each active communication unit, affiliating with an allocated communication resource to receive updated encryption key information from the key management terminal when the stored rekey session number and the rekey session number do not substantially match.

2. The method of claim 1 further comprises:

f) for the each active communication unit, not affiliating with the allocated communication resource when the stored rekey session number and the rekey session number substantially match.

3. In the method of claim 1, the initiation of the key updating message of step (a) further comprises initiating the key updating message at predetermined intervals as at least a part of the predetermined communication group updating procedure.

4. In a secure communication system that includes a plurality of communication units, a limited number of communication resources, a communication resource allocator, and a key management terminal, a method for a communication unit of the plurality of communication units to receive updated encryption key information, the method comprises the steps of:

a) receiving, by the communication unit, a rekey session number from the communication resource allocator;

b) comparing, by the communication unit, the rekey session number with a stored rekey session number; and c) when the stored rekey session number and the rekey session number do not substantially match, affiliating, by the communication unit, with an allocated communication resource to receive updated encryption key information from the key management terminal.

5. The method of claim 4 further comprises:

d) when the stored rekey session number and the rekey session number substantially match, not affiliating with the allocated communication resource.

6. In a secure communication system that includes a plurality of communication units, a limited number of communication resources, a communication resource allocator, and a key management terminal, wherein the plurality of communication units are arranged into communication groups, a method for the communication resource allocator to receive and transmit updated encryption key information, the method comprises the steps of:

a) receiving, by the communication resource allocator, a key updating message from the key management terminal which includes identity of at least one particular communication group;

b) allocating, by the communication resource allocator, a communication resource to the key management terminal and communication units of the at least one particular communication group; and c) transmitting, by the communication resource allocator, a rekey session number and the communication resource to the communication units of the at least one particular communication group.

* * * * *